US012627591B2

(12) United States Patent
Peng et al.

(10) Patent No.: US 12,627,591 B2
(45) Date of Patent: May 12, 2026

(54) METHOD FOR RECEIVING BGP-INTENT ROUTE, AND METHOD FOR ADVERTISING BGP-INTENT ROUTE

(71) Applicant: ZTE Corporation, Shenzhen (CN)

(72) Inventors: Shaofu Peng, Shenzhen (CN); Bin Tan, Shenzhen (CN); Aihua Liu, Shenzhen (CN); Quan Xiong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 275 days.

(21) Appl. No.: 18/704,264

(22) PCT Filed: Aug. 1, 2022

(86) PCT No.: PCT/CN2022/109512
§ 371 (c)(1),
(2) Date: Apr. 24, 2024

(87) PCT Pub. No.: WO2023/071359
PCT Pub. Date: May 4, 2023

(65) Prior Publication Data
US 2025/0007816 A1     Jan. 2, 2025

(30) Foreign Application Priority Data

Oct. 25, 2021    (CN) .......................... 202111243804.0

(51) Int. Cl.
*H04L 47/125*       (2022.01)
*H04L 45/02*        (2022.01)
(Continued)

(52) U.S. Cl.
CPC ............ *H04L 45/04* (2013.01); *H04L 45/124* (2013.01); *H04L 47/125* (2013.01); *H04L 47/39* (2013.01)

(58) Field of Classification Search
CPC ..... H04L 45/04; H04L 45/124; H04L 47/125; H04L 47/39; H04L 45/121; H04L 45/122; H04L 45/026; H04L 45/125
See application file for complete search history.

(56) References Cited

U.S. PATENT DOCUMENTS 9,660,897 B1 *   5/2017   Gredler .................. H04L 45/50
2013/0132542 A1 *  5/2013   Zhang ..................... H04L 45/04
                                                                709/223

(Continued)

FOREIGN PATENT DOCUMENTS

CN          103609080 A      2/2014
CN          104012050 A      8/2014
(Continued)

OTHER PUBLICATIONS

International Search Report for corresponding application PCT/CN2022/109512 filed Aug. 1, 2022; Mail date Oct. 25, 2022.
(Continued)

*Primary Examiner* — Johnny B Aguiar
(74) *Attorney, Agent, or Firm* — CANTOR COLBURN LLP

(57) ABSTRACT

Provided are a method for receiving border gateway protocol (BGP)-intent route, and a method for advertising BGP-intent route. The method for receiving BGP-intent route includes: receiving the BGP-intent route advertised by a BGP speaker, where the BGP-intent route carries at least one of the following: a metric type, a metric and metric credit information.

16 Claims, 3 Drawing Sheets

Receive BGP-intent route advertised by a BGP speaker, wherein the BGP-intent route carries at least one of the following: a metric type, a metric, or metric credit information

S202

(51) Int. Cl.
    *H04L 45/12* (2022.01)
    *H04L 47/10* (2022.01)

(56) References Cited

U.S. PATENT DOCUMENTS

| | | | | |
|---|---|---|---|---|
| 2014/0129735 A1* | 5/2014 | Thyni | .................. | H04L 45/124 |
| | | | | 709/241 |
| 2014/0376371 A1* | 12/2014 | Flinck | .................. | H04L 47/125 |
| | | | | 370/230 |
| 2020/0162365 A1* | 5/2020 | Liu | ..................... | H04L 43/0894 |
| 2020/0382387 A1 | 12/2020 | Pasupathy et al. | | |
| 2021/0250273 A1 | 8/2021 | Kaplan et al. | | |
| 2021/0258249 A1* | 8/2021 | Torvi | .................. | H04L 45/566 |

FOREIGN PATENT DOCUMENTS

| | | |
|---|---|---|
| CN | 108259331 A | 7/2018 |
| CN | 110890976 A | 3/2020 |
| CN | 111355657 A | 6/2020 |
| CN | 111431800 A | 7/2020 |
| CN | 112583714 A | 3/2021 |
| EP | 3435599 A1 | 1/2019 |
| JP | 2015507404 A | 3/2015 |

OTHER PUBLICATIONS

Chinese Office Action; Application No. 2021112438040; Filing Date: Oct. 25, 2021; Date of mailing: Nov. 30, 2025; 6 pages.
European Search Report for corresponding application EP 22 885259; Report dated Jan. 24, 2025.
Mohapatra Sproute Networks, "The Accumulated IGP Metric Attribute for BGP" Aug. 7, 2014, pp. 1-15, XP015104422.
Rao Agrawal, "BGP Color Aware Routing draft-dskc-bess . . . ", Internet Engineering Task Force, No. 2, May 11, 2021, pp. 1-45, XP015145759.
Sangli S. Hedge R Das Juniper Networks Inc, No. 1, Jul. 26, 2021, pp. 1-15, XP015147188.
Japanese Office Action; Application No. 2024525145; date of mailing: Jun. 16, 2025; 10 pages.
Sangli, S. et al, "Generic Metric for the AIGP Attribute" (Retrieved from internet Jun. 16, 2025) https://datatracker.ietf.org/doc/html/draft-ssangli-idr-bgp-generic-metric-aigp-01, 13 pages.

* cited by examiner

Receive BGP-intent route advertised by a BGP speaker, wherein the BGP-intent route carries at least one of the following: a metric type, a metric, or metric credit information     S202

Advertise BGP-intent route to a neighbor BGP speaker, wherein the BGP-intent route carries at least one of the following: a metric type, a metric, or metric credit information     S302

```
+------------------------------------------------------------------------------+
| Count of Sources (1 octet)                                                   |
+------------------------------------------------------------------------------+
| Flags (1 octet)                                                              |
+------------------------------------------------------------------------------+
//Network Address of Source (variable)                                       //
+------------------------------------------------------------------------------+
|Total Metric Credit for Source (4 octets)                                     |
+------------------------------------------------------------------------------+
|Estinated BGP Hops Count for Source (1 octet)                                 |
+------------------------------------------------------------------------------+
//current Hop Number (1 octet)                                               //
//Metric Credit Piece[Hops Count](Hops Count*2 octets)                       //
+------------------------------------------------------------------------------+
//        ... For other Sources ...                                          //
+------------------------------------------------------------------------------+
```

IGP domain 1                    IGP domain 2

Receiving module ⟋ 702

Advertisement module ⟋ 802

METHOD FOR RECEIVING BGP-INTENT ROUTE, AND METHOD FOR ADVERTISING BGP-INTENT ROUTE

CROSS-REFERENCE TO RELATED APPLICATION

The disclosure is a national stage filing under 35 U.S.C. § 371 of international application number PCT/CN2022/109512, filed Aug. 1, 2022, which claims the priority to Chinese Patent Application No. 202111243804.0, filed with the Chinese Patent Office on Oct. 25, 2021, and entitled "Method for Receiving BGP-intent Route, and Method for Advertising BGP-intent Route", which is incorporated herein in its entirety by reference.

TECHNICAL FILED

The disclosure relates to the field of data communication, in particular to a method for receiving BGP-intent route and a method for advertising BGP-intent route.

BACKGROUND

In a large-scale network across a plurality domains, a border gateway protocol (BGP) is generally used to provide an intent-aware end-to-end path. The intent-aware route means that BGP route chooses a underlying transmission path according to a clear intent when iterating a next hop, which means that BGP route needs to carry intent information when advertised. Since the underlying transmission path is a traffic engineering path established based on a specific intent, the intent can be referred to as a traffic engineering target in a network providing transmission services. At present, the BGP route can carry the intent information when advertised by numerous methods. For example, draft-kaliraj-idr-bgp-classful-transport-planes-12 defines "Classful Transport" SAFI NLRI and "Transport Class" Route Target extended community, draft-dskc-bess-bgp-car-02 defines BGP CAR SAFI NLRI, and draft-zhou-idr-inter-domain-lcu-02 directly uses Color extended community. In this paper, such BGP route is collectively referred to as BGP-intent route.

In general, a node that receives an advertisement message of the BGP-intent route will interpret the intent locally according to intent configuration information (also referred to as an intent-template), and then establish the transmission path or select an existing transmission path that satisfies the intent and reaches a message advertised party. The intent configuration information includes a set of constraints, such as a size of a link bandwidth to be provided in the path, minimum and maximum delay limits, a delay jitter limit, a packet loss rate limit, inclusion or exclusion of specific nodes or links, and limiting of a computation path in a specific virtual network. On an Ingress PE node (that is, the node responsible for service access) in the network, the BGP-intent route to the Egress PE that can match service demand will be selected according to a service level agreement (SLA). That is, the intent configuration information on the ingress PE node is generally consistent with the SLA, but intent configuration information on an intermediate node should also be consistent with the SLA. For example, observation of BGP routing forwarding behavior across multiple domains needs to "provide a path with an upper delay limit of 100 ms from the Ingress PE to the Egress PE" according to the SLA. Apparently, the delay of 100 ms refers to an upper limit of an end-to-end cumulative delay, rather than a cumulative delay of a certain segment during the BGP routing forwarding. That is to say, intermediate BGP speakers in the path cannot also establish a transmission path or select an existing transmission route to a next BGP speaker based on the delay of 100 ms. In order to solve this problem, a complicated configuration method is to include different delay indicators (or delay credits) in intent-templates configured on different BGP speakers in the path. However, this static configuration method has obvious defects since a certain intent-template is not necessarily associated to a specific end-to-end path, and may serve multiple paths.

It is still a pressing issue to solve the problem that contents carried in the BGP-intent route decrease efficiency of establishment of the transmission path of the BGP-intent route in the related art.

To this end, it is necessary to improve the related art to overcome the defects in the related art.

SUMMARY

Embodiments of the disclosure provide a method for receiving border gateway protocol (BGP)-intent route and a method for advertising BGP-intent route for at least solving the problem that contents carried in BGP-intent route decrease efficiency of establishment of a transmission path of the BGP-intent route in the related art.

According to one aspect of the embodiment of the disclosure, a method for receiving BGP-intent route is provided. The method for receiving BGP-intent route includes: receiving the BGP-intent route advertised by a BGP speaker, wherein the BGP-intent route carries at least one of the following: a metric type, a metric and metric credit information.

According to another aspect of the embodiment of the disclosure, a method for advertising BGP-intent route is provided. The method for advertising BGP-intent route includes: advertising the BGP-intent route to a neighbor BGP speaker, wherein the BGP-intent route carries at least one of the following: a metric type, a metric and metric credit information.

According to yet another aspect of the embodiment of the disclosure, an apparatus for receiving BGP-intent route is provided. The apparatus for receiving BGP-intent route includes: a Receiving module configured to receive the BGP-intent route advertised by a BGP speaker, wherein the BGP-intent route carries at least one of the following: a metric type, a metric and metric credit information.

According to yet another aspect of the embodiment of the disclosure, an apparatus for advertising BGP-intent route is provided. The apparatus for advertising BGP-intent route includes: an advertisement module configured to advertise the BGP-intent route to a neighbor BGP speaker, wherein the BGP-intent route carries at least one of the following: a metric type, a metric and metric credit information.

According to yet another aspect of the embodiment of the disclosure, a computer-readable storage medium is further provided. The computer-readable storage medium stores a computer program, wherein the computer program is configured to execute any method described above when running.

According to still another aspect of the embodiment of the disclosure, an electronic apparatus is further provided. The electronic apparatus includes a memory, a processor and a computer program that is stored in the memory, and the processor executes the computer program to perform any method described above.

According to the disclosure, the BGP-intent route advertised by the BGP speaker is received, wherein the BGP-intent route carries at least one of the following: the metric type, the metric and the metric credit information. Thus, the problem that efficiency of establishment of the transmission path of the routing in the related art is low is solved, and the efficiency of establishment of the transmission path is improved.

BRIEF DESCRIPTION OF THE DRAWINGS

The drawings described herein serve to provide further understanding of the disclosure as a constituent part of the description. Illustrative embodiments of the disclosure and their specification are used for explaining the disclosure, and do not constitute improper limitation to the disclosure. In the accompanying drawings.

DETAILED DESCRIPTION OF THE EMBODIMENTS

In order to make a person of ordinary skill in the art better understand solutions of the disclosure, technical solutions in embodiments of the disclosure will be clearly and completely described below with reference to the accompanying drawings in the embodiments of the disclosure. Apparently, the described embodiments are only some embodiments rather than all embodiments of the disclosure. All other embodiments derived by a person of ordinary skill in the art from the embodiments of the disclosure without creative efforts shall fall within the protection scope of the disclosure.

It should be noted that the terms "first", "second", etc. in the description, claims and the accompanying drawings of the disclosure are used to distinguish similar objects, but are not necessarily used to describe a specific sequence or a precedence order. It should be understood that data used in this way can be interchanged under appropriate circumstances, such that the embodiment of the disclosure described herein can be implemented in a sequence other than those illustrated or described herein. In addition, terms "comprise", "include", "provide with", and their any variation are intended to cover non-exclusive inclusions, for example, processes, methods, systems, products, or devices that include a series of steps or units are not necessarily limited to those clearly listed steps or units, but can include other steps or units not explicitly listed or inherent to these processes, methods, products, or devices.

Figures 1, 2, 3:
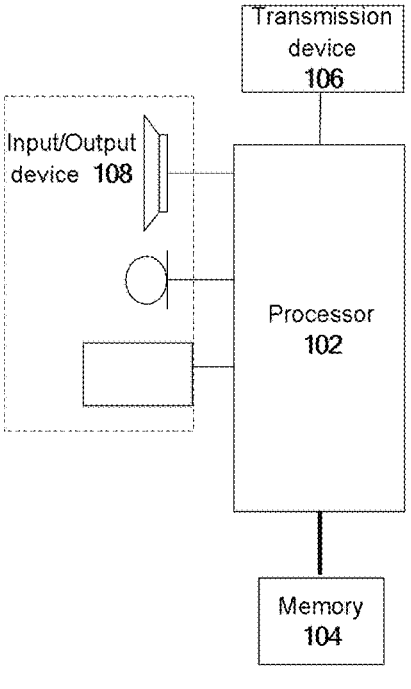
FIG. 1 is a block diagram of a hardware structure of a computer terminal of a method for receiving border gateway protocol (BGP)-intent route according to an embodiment of the disclosure.
FIG. 2 is a flowchart of a method for receiving BGP-intent route according to an embodiment of the disclosure.
FIG. 3 is a flowchart of a method for advertising BGP-intent route according to an embodiment of the disclosure.

A method embodiment of the embodiments of the disclosure may be executed in a computer terminal or a similar computation apparatus. With running on the computer terminal as an example. FIG. 1 is a block diagram of a hardware structure of a computer terminal of a method for receiving border gateway protocol (BGP)-intent route according to an embodiment of the disclosure. As shown in FIG. 1, the computer terminal may include one or more (only one is shown in FIG. 1) processors 102 (the processor 102 may include, but is not limited to, a microprocessor unit (MPU) or a programmable logic device (PLD)) and a memory 104 configured to store data. In an illustrative example, the computer terminal may also include a transmission device 106 configured to communicate and an input and output device 108. It can be understood by those skilled in the art that a structure shown in FIG. 1 is only schematic and does not limit a structure of the computer terminal described above. For example, the computer terminal may further include components more or fewer than components shown in FIG. 1, or have a configuration that has functions equivalent to functions shown in FIG. 1 or more than functions shown in FIG. 1.

The memory 104 may be configured to store a computer program, for example, a software program and module of application software, for example, a computer program corresponding to the method for receiving BGP-intent route in the embodiment of the disclosure. The processor 102 executes various functional applications and data processing, that is, implements the method described above, by running the computer program stored in the memory 104. The memory 104 may include a high-speed random access memory: and may further include a non-volatile memory, such as one or more magnetic storage apparatuses, a flash memory, or other non-volatile solid-state memories. In some instances, the memory 104 may further include memories remotely arranged with respect to the processor 102, and these remote memories may be connected to the computer terminal through a network. Instances of the network described above include, but are not limited to, the Internet, an Intranet, a local area network, a mobile communication network and their combinations.

The transmission device 106 is configured to receive or transmit data via one network. Specific instances of the network described above may include a wireless network provided by a communication provider of the computer terminal. In an instance, the transmission device 106 includes a network interface controller (NIC), and may be connected to other network devices through a base station so as to communicate with the Internet. In an instance, the transmission device 106 may be a radio frequency (RF) module and is arranged to communicate with the Internet in a wireless mode.

FIG. 2 is a flowchart of a method for receiving BGP-intent route according to an embodiment of the disclosure. As shown in FIG. 2, the method includes:

Step 202. The BGP-intent route advertised by a BGP speaker is received, wherein the BGP-intent route carries at least one of the following: a metric type, a metric and metric credit information.

According to the step, the BGP-intent route advertised by the BGP speaker is received, wherein the BGP-intent route carries at least one of the following: the metric type, the metric and the metric credit information. Thus, the problem that contents carried in the BGP-intent route decrease efficiency of establishment of the transmission path of the BGP-intent route in the related art is solved, and the efficiency of establishment of the transmission path is further improved by carrying the metric type, the metric and the metric credit information in the BGP-intent route.

Further, in an embodiment, the metric type includes an interior gateway protocol (IGP) metric, a link delay metric, a link and node delay metric, a traffic engineering (TE) default metric and a bandwidth metric: the metric credit information includes: a total metric credit, an estimated BGP hops count and a metric credit piece: and the metric credit information only includes one piece of information unrelated to a specific source: and alternatively, the metric credit information includes a plurality of pieces of information, and the plurality of pieces of information correspond to a plurality of specific sources in a one-to-one manner.

It should be noted that the link delay metric may include a link delay, but is not limited thereto.

It should be noted that the link and node delay metric may simultaneously include a link delay and a delay in a node, but is not limited thereto.

Further, in an embodiment, after the step that BGP-intent route advertised by a BGP speaker is received, a technical solution is further provided, and specifically includes: an intent identifier is obtained from the BGP-intent route, and intent information is obtained by locally searching, according to the intent identifier, for an intent template. A transmission path is established or an existing transmission path is selected for the BGP-intent route according to the intent information.

Further, in an embodiment, a technical solution that a transmission path is established or an existing transmission path is selected for the BGP-intent route according to the intent information is provided, and includes: a reference value of a metric credit piece of a transmission path between a current BGP speaker and a downstream neighbor BGP speaker of the current BGP speaker is determined according to the metric, a total metric credit, an estimated BGP hops count and a metric credit piece that are included in the BGP-intent route. An accumulated metric of a metric type of the transmission path established or the existing transmission path selected is limited to be less than or equal to the reference value of the metric credit piece, and the transmission path is established or the existing transmission path is selected.

Further, in an embodiment, under the condition that the metric credit information included in the BGP-intent route only includes a total metric credit related to a source, but does not include an explicit metric credit piece, for a metric credit attribute corresponding to each source: an average metric credit between two adjacent BGP speakers in an end-to-end path is obtained by dividing the total metric credit by an estimated BGP hops count. A metric residual value is obtained by subtracting the metric included in the BGP-intent route from the total metric credit.

Further, in an embodiment, the method further includes: an average metric credit and metric residual values are computed for all sources, wherein a reference value of a metric credit piece of a transmission path between a current BGP speaker and a downstream neighbor BGP speaker includes a minimum positive value of the average metric credit and the metric residual values that are computed for all sources.

Further, in an embodiment, a technical solution is provided and specifically includes: under the condition that the BGP-intent route further includes an explicit metric credit piece, for metric credit information corresponding to each source: a metric credit piece corresponding to a current BGP speaker is obtained from the BGP-intent route according to a position number of the current BGP speaker in an end-to-end path. A metric residual value is obtained by subtracting the metric included in the BGP-intent route from a total metric credit.

Further, in an embodiment, according to the method, for metric credit pieces and metric residual values computed for all sources: a reference value of a metric credit piece of a transmission path between a current BGP speaker and a downstream neighbor BGP speaker includes a minimum positive value of the metric credit pieces and the metric residual values that are computed for all the sources.

Further, in an embodiment, a path whose accumulated metric of a metric type is closest to the reference value of the metric credit piece is selected from all candidate transmission paths under the condition a current BGP speaker finds that there is no transmission path that extends to a downstream BGP speaker and satisfies the reference value of the metric credit piece. In the embodiment of the disclosure, the condition may be relaxed to increase a margin and then a path whose accumulated metric of a metric type is closest to the reference value of the metric credit piece is selected from all candidate transmission paths under the condition a current BGP speaker has no qualified transmission path.

Further, a transmission path from the current BGP speaker to the downstream BGP speaker at least includes one of the following: a shortest forwarding path and a traffic engineering path. The transmission path includes a plurality of sub-paths, and through the plurality of sub-paths, a load sharing, or fast reroute (FRR) protection, or a multi-stream replication and elimination path is formed, wherein under the condition the multi-stream replication and elimination path is formed through the plurality of sub-paths, a metric difference between the plurality of sub-paths satisfies a set limit value.

FIG. 3 is a flowchart of a method for advertising BGP-intent route according to an embodiment of the disclosure. As shown in FIG. 3, the method includes:

S302. The BGP-intent route is advertised to a neighbor BGP speaker, wherein the BGP-intent route carries at least one of the following: a metric type, a metric and metric credit information.

According to the step, the BGP-intent route is advertised to the neighbor BGP speaker, wherein the BGP-intent route carries at least one of the following: the metric type, the metric and the metric credit information. Thus, the problem that contents carried in the BGP-intent route decrease efficiency of establishment of the transmission path of the BGP-intent route in the related art is solved, and the efficiency of establishment of the transmission path is further improved by carrying the metric type, the metric and the metric credit information in the BGP-intent route.

Further, in an embodiment, the metric type includes an IGP metric, a link delay metric, a link and node delay metric, a TE default metric and a bandwidth metric: the metric credit information includes: a total metric credit, an estimated BGP hops count and a metric credit piece: and the metric credit information only includes one piece of information unrelated to a specific source: and alternatively, the metric credit information includes a plurality of pieces of information, and the plurality of pieces of information correspond to a plurality of specific sources in a one-to-one manner.

Further, in an embodiment, a metric corresponding to the metric type equals a sum of a metric included in a BGP-intent route advertisement received from a downstream neighbor BGP speaker and an accumulated metric corresponding to a metric type of a transmission path from a current BGP speaker to the downstream neighbor BGP speaker. Alternatively, a metric corresponding to the metric type equals a certain initial value set under the condition a current BGP speaker is an original advertisement node.

It should be noted that the initial value may equal 0, but is not limited thereto.

A more general method will be discussed below in conjunction with the following embodiments. Through the method, the BGP speaker receiving the BGP-intent route can establish the transmission path or select the existing transmission path to a next BGP speaker with a more flexible and accurate intent.

In an embodiment, a technical solution is provided and specifically includes:

Step 1: A BGP is extended. Under the condition that a certain BGP speaker advertises BGP-intent route to an upstream neighbor, a metric type, a metric and metric credit information may be optionally carried. The metric credit information consists of a total metric credit, an estimated BGP hops count and a metric credit piece. The metric credit information may only include one piece unrelated to a specific source (that is, a specific Ingress provider edge (PE)), or may include a plurality of pieces corresponding to specific sources in a one-to-one manner.

Step 2, The BGP speaker that receives a BGP-intent route advertisement obtains an intent identifier from the BGP-intent route advertisement, obtains intent information by locally searching for an intent template, and establishes a transmission path or selects an existing transmission path according to the intent information. Especially, when the transmission path is established or the existing transmission path is selected, it is necessary to obtain "a reference value of the metric credit piece" of a transmission path between a current BGP speaker and a downstream neighbor BGP speaker according to the metric, the total metric credit, the estimated BGP hops count and explicit metric credit piece information that are included in the route advertisement. As a basis for establishing the transmission path or selecting the existing transmission path, an accumulated metric of a corresponding metric type of this transmission path used is limited to below the "reference value of the metric credit piece".

In order to better understand step 1, reference can be made to a recommended specific protocol extension form of the BGP as follows:

RFC4271 defines path attributes of the BGP, is carried by the BGP route when advertised and describes various attributes of the route. The disclosure adds the following attribute type codes and their attribute values to represent the metric type, the metric credit and other attributes, but is not limited thereto. Note: The metric attribute is an accumulated interior gateway protocol (AIGP) attribute defined in the RFC7311.

It should be noted that in an embodiment, the above metric type and metric credit attributes are described specifically as follows:

a) The metric type attribute: when a type code of a path attribute=TBD1 (to be assigned by the Internet Assigned Numbers Authority (IANA)), it means that an attribute value includes a metric type attribute with a length of one byte. The metric type attribute is an optional non-transitive attribute, configured to indicate a type of metric included in the AIGP Attribute, and has the following values at present:

0: IGP metric (defined in RFC5305, RFC2328 and RFC 5340);

1: Unidirectional Link Delay (defined in RFC7810);
   2: TE default metric (defined in RFC5305);
   3: Bandwidth Metric (defined in draft-ietf-lsr-flex-algo-bw-con-01);
   4: Deterministic Delay Metric (discussed in other documents, the unidirectional link delay only considers a link delay while the deterministic delay includes both the link delay and a delay within a node);
   5-255: to be defined in the future.

b) The metric credit attribute: when a type code of a path attribute=TBD2 (to be assigned by the IANA), it means that an attribute value includes a metric type attribute in a following format. The metric credit attribute is an optional non-transitive attribute, and configured to indicate end-to-end information such as the total metric credit, the estimated BGP hops count and the metric credit piece.

Figures 4, 5:
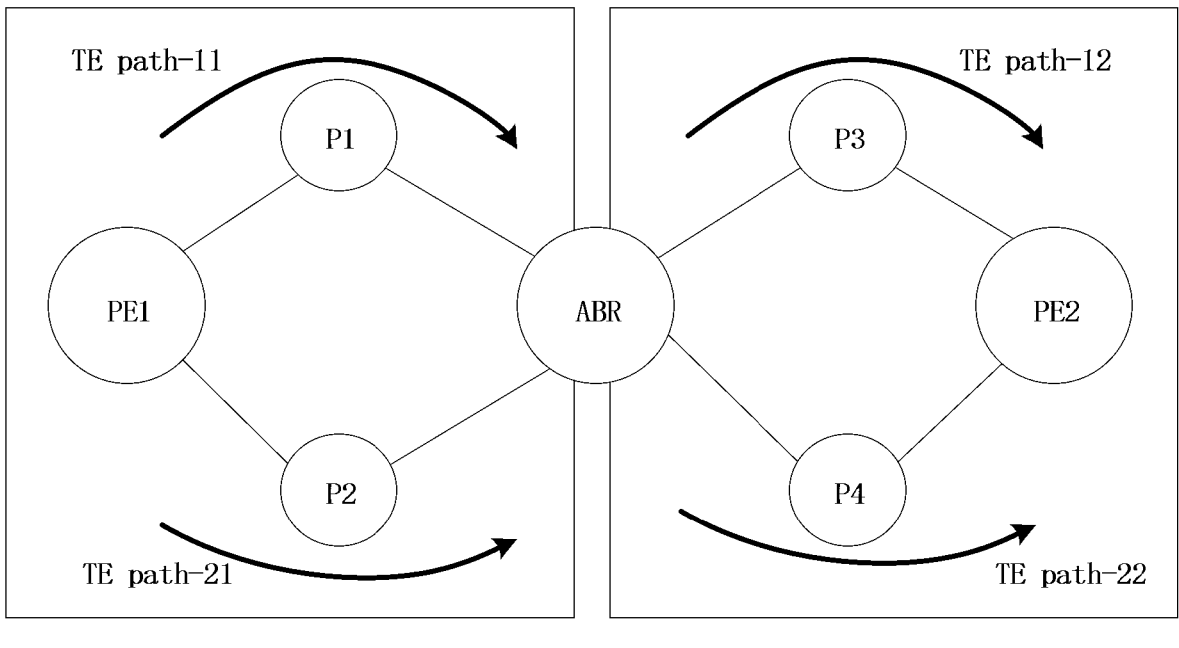
FIG. 4 is a schematic diagram of a format of a metric credit attribute according to an embodiment of the disclosure.
FIG. 5 is a schematic diagram of transmission paths with different intents between the same source and the same destination according to an embodiment of the disclosure.

In an embodiment, the metric credit attribute can be described with reference to FIG. 4. FIG. 4 is a schematic diagram of a format of a metric credit attribute according to an embodiment of the disclosure. Fields in FIG. 4 are explained as follows:

Count of Sources: 1 byte, with a value not less than 1, indicating a result of a count of sources, that is, a quantity of metric credit information corresponding to the source (that is, Ingress PE). The metric credit information corresponding to each source consists of "Flags", "Network Address of Source", "Total Metric Credit for Source", "Estimated BGP Hops Count for Source", "Current Hop Number" and "Metric Credit Piece[ ]".

Flags: 1 byte, a flag bit. At present, three flags are defined as follows:

S-Flag: a source address flag, indicating whether the field of Network Address of Source is included. 0 indicates not including, and 1 indicates including.

F-Flag: a family flag, indicating an address cluster of the Network Address of Source. When the S-Flag is 1, a length of the Network Address of Source is determined according to the F-Flag, wherein 0 indicates a 4-byte IPv4 address and 1 indicates a 16-byte IPv6 address.

P-Flag: a piece flag, indicating whether specific metric credit piece information (consisting of "Current Hop Number" and "Metric Credit Piece[ ]") is included, with 0 indicating not including and 1 indicating including.

Network Address of Source: a number of bytes is variable, indicating an IP address of the Source. When the S-Flag is 0, this field does not exist. When the S-Flag is 1 and the F-Flag is 0, this field is a 4-byte IPv4 address. When the S-Flag is 1 and the F-Flag is 1, this field is a 16-byte IPV6 address. If the Network Address of Source does not exist, it means that the metric credit information is unrelated to a specific source. This case generally occurs in a coarse-grained scenario where it is hoped to control establishment of the transmission path based on the metric credit. For example, when an Egress PE advertises the BGP-intent route to a plurality of Ingress PEs in an autonomous system (AS) in the single AS, only a single piece of unified metric credit information that is unrelated to the source is carried.

Total Metric Credit for Source: 4 bytes, indicating a total metric credit from a specific source (or any source when the Network Address of Source does not exist) to the Egress PE.

Estimated BGP Hops Count for Source: 1 byte, indicating an estimated BGP hops count from a specific source (or any source when the Network Address of Source does not exist) to the Egress PE, with those BGP Speakers who need to change BGP Next-hops to be the BGP Speakers when the BGP-intent route advertisement is received are included. For example, in an advertisement path S-A-B-C-D composed of five BGP Speakers, S indicates an Ingress PE, D indicates an Egress PE, and A/B/C indicates three intermediate BGP speaker nodes. Each speaker will modify BGP Next-hop to itself when receiving the BGP-intent route advertisement, and the estimated BGP hops count in this case is 4, that is, the entire advertisement path consists of 4 segments.

Current Hop Number: 1 byte, indicating a current sub-script of an array Metric Credit Piece[ ]. Note that when the P-Flag is 0, the fields "Current Hop Number" and "Metric Credit Piece[ ]" do not exist. In a BGP-intent route adver-tisement message sent by the Egress PE to a neighboring upstream BGP Speaker neighbor, the initial value of the Current Hop Number is 0. Every time the BGP-intent route advertisement message passes through one BGP Speaker and the BGP Speaker changes the BGP Next-hop of the route to itself, the BGP Speaker will read an element from the array Metric Credit Piece[ ] according to a subscript Current Hop Number, obtain the metric credit piece of the transmission path from the current BGP Speaker to the downstream BGP Speaker neighbor, and then increase the Current Hop Number in the message by 1 and continue to advertise route to an upstream BGP Speaker neighbor. Note that when the element is read from the array Metric Credit Piece[ ] according to the subscript Current Hop Number, it is necessary to avoid the array out of bounds.

Metric Credit Piece[ ]: an array with a number of included elements specified by the Estimated BGP Hops Count for Source, and each element in 2 bytes. In a process of BGP-intent route advertisement, every BGP Speaker in the path will use the Current Hop Number as the subscript to access the array when changing the BGP Next-hop of the route to itself, so as to obtain explicit metric credit piece information. There are very strict restrictions on the use of the metric credit piece, that is, BGP-intent route should be advertised to the specific Source hop by hop in strict accordance with an expected advertisement path of the Egress PE. When an exception occurs, the BGP Speaker finds that a value of the Current Hop Number in the received BGP-intent route advertisement message is greater than or equal to a value of the Estimated BGP Hops Count for Source, and should stop looking for the transmission path according to the metric credit piece information.

In order to better understand step 2, step 2 may be described with reference to the following embodiments.

Embodiment 1

In this embodiment, under the condition that metric credit attribute information included in a BGP-intent route adver-tisement message only includes a total metric credit related to a source, but does not include explicit metric credit piece information, for metric credit information corresponding to each source, operations may be performed as follows:

Operation 1: A variable total_metric_credit_value is set as a value of Total Metric Credit for Source.

Operation 2: A variable bgp_hops_count is set as a value of Estimated BGP Hops Count for Source.

Operation 3: A variable metric_value is set as a value of the metric included in an AIGP Attribute of the BGP-intent route received.

Operation 4: A variable metric_residual_value is set as a residual metric, wherein metric_residual_value=total_metric_credit_value−metric_value.

It should be noted that when there are a plurality of pieces of metric credit information each for a specific source, BGP-intent route may accumulate a great metric_value when advertised, resulting in a negative metric_residual_ value corresponding to a certain source and a positive metric_residual_value corresponding to other sources.

Operation 5: A variable average_metric_credit_value is set as an average metric credit between every adjacent BGP Speaker in an end-to-end path, where average_metric_credit_value=total_metric_credit_value/bgp_hops_count:

In addition, for the metric credit information correspond-ing to all sources, operations may be performed as follows:

Operation 6: A variable min_metric_residual_value is set as a minimum positive value of metric_residual_values corresponding to all the sources.

Operation 7: A variable min_average_metric_cred-it_value is set as a minimum value of average_metric_cred-it_value corresponding to the sources.

In this embodiment, the "a reference value of a metric credit piece" of the transmission path from one BGP speaker to a downstream neighbor BGP speaker is a minimum of min metric_residual_value and min_average_metric_cred-it_value.

Embodiment 2

In this embodiment, under the condition that a BGP-intent route advertisement message further includes explicit metric credit piece information, for metric credit information cor-responding to each source, operation may be performed as follows:

Operation 8: A variable total_metric_credit_value is set as a value of Total Metric Credit for Source.

Operation 9: A variable bgp_hops_count is set as a value of Estimated BGP Hops Count for Source.

Operation 10: A variable metric_value is set as a value of the metric included in an AIGP Attribute of the BGP-intent route received.

Operation 11: A variable metric_residual_value is set as a residual metric, where metric_residual_value=total_metric_credit_value−metric_value.

It should be noted that when there are a plurality of pieces of metric credit information each for a specific source, BGP-intent route may accumulate a great metric_value when advertised, resulting in a negative metric_residual_value corresponding to a certain source and a positive metric_residual_value corresponding to other sources.

Operation 12: A variable explicit_metric_credit_piece_value is set as a value of the element read from the array Metric Credit Piece[ ] according to the subscript Current Hop Number. Note that if the reading is out of bounds, explicit_metric_credit_piece_value is considered to be 0;

In addition, for the metric credit information correspond-ing to all sources, operations may be performed as follows:

Operation 13: A variable min_metric_residual_value is set as a minimum positive value of metric_residual_values corresponding to all the sources.

Operation 14: A variable min_explicit_metric_credit_piece_value is set as a minimum positive value of explicit_metric_credit_ piece_value corresponding to the sources.

In this embodiment, the "a reference value of a metric credit piece" of the transmission path from one BGP speaker to a downstream neighbor BGP speaker is a minimum of min_metric_residual_value and min_explicit_metric_credit_piece_value.

Through the above embodiment, it can be determined that the "metric credit piece reference value" computed in the above embodiment is to restrict the accumulated metric of this transmission path to the "the reference value of the metric credit piece". But in some cases, the current BGP Speaker finds that there is no transmission path that may satisfy the above requirements, so this restriction may be relaxed appropriately. However, compared with other candidate transmission paths, an accumulated metric of a corresponding metric type of a transmission path finally used by this BGP Speaker is closest to the "the reference value of the metric credit piece".

In the BGP-intent route generated on the current BGP Speaker, the metric type included is copied from the route advertisement received, and an attribute value of the metric included is updated to the metric included in the route advertisement received plus an accumulated metric of a corresponding metric type of the transmission path used. The metric credit attribute included is copied from the route advertisement received (note that the Current Hop Number should be increased by 1).

In addition, the current BGP Speaker may continue to advertise the BGP-intent route generated to upstream BGP Speaker neighbors and change a BGP Next-hop to itself. In this case, the route advertisement will carry the updated metric attribute and metric credit attribute.

The method for receiving BGP-intent route of the disclosure will be described below with reference to the following embodiments.

Embodiment 3

This embodiment is described in conjunction with FIG. 5. FIG. 5 is a schematic diagram of transmission paths with different intents between the same source and the same destination according to an embodiment of the disclosure. A network shown in FIG. 5 includes two interior gateway protocol (IGP) domains. BGP neighbors are established between PE1 and area border routers (ABR) and between ABR and PE2 to advertise BGP-intent route. For embodiment, according to a method described in draft-zhou-idr-inter-domain-lcu-02, an Egress PE2 advertises loopback route (denoted as loopback-PE2) to the ABR through the BGP, and carries a Color extended community in the route advertisement to carry intent information. After receiving the route advertisement, the ABR continues performing advertisement to the PE1 through the BGP, that is, the Ingress PE1, the ABR and the Egress PE2 are BGP Speakers in the above solution.

It is assumed that in this embodiment, there are two types of services to be communicated between the Ingress PE1 and the Egress PE2. An intent of one type of service is that a total end-to-end delay of a transmission path used cannot exceed 10 ms, and an intent of the other type of service is that a total end-to-end delay of a transmission path used cannot exceed 100 ms. Since it is necessary to characterize two paths with related intents between the same source/ destination, in this embodiment, it is necessary to configure two colors on the Egress PE2, which are denoted as color-1000 and color-2000.

It should be noted that intent configuration corresponding to Color-1000 is as follows: metric-type: Unidirectional Link Delay (unit: ms); total-metric: 10); metric-credit enabled.

It should be noted that intent configuration corresponding to Color-2000 is as follows: metric-type: Unidirectional Link Delay (unit: ms); total-metric: 100; metric-credit enabled.

The intent configuration information corresponding to the two colors is also uniformly configured on other BGP Speaker nodes (ABR, Ingress PE1). It should be noted that since the metric-credit enabled command is included in the intent configuration information, these other BGP Speakers will not compute a transmission path to a downstream BGP Speaker neighbor just according to a total metric included in the intent configuration information after receiving the BGP-intent route advertisement from the downstream BGP speaker neighbor. Instead, these other BGP Speakers obtain the metric credit information from the BGP-intent route advertisement received, and establish a transmission path or use an existing transmission path that satisfy the intent accordingly. Alternatively, the total metric information may not be included in the intent configuration configured on these other BGP Speaker nodes.

In this embodiment, a technical solution is provided, and specifically includes:

Step 1) The Egress PE2 generates the BGP-intent route and advertises same to the ABR: on the Egress PE2, two pieces of BGP-intent route are generated correspondingly, <prefix=loopback-PE2, color=1000> and <prefix= loopback-PE2, color=2000>, and are advertised to the ABR, and the BGP Next-hop in the route advertisement is the Egress PE2.

It should be noted that when the BGP-intent route<prefix=loopback-PE2, color=1000> is advertised, information included in the route advertisement may be set according to the intent configuration information corresponding to color-1000, that is, the metric type is set as the Unidirectional Link Delay; and an initial metric is set as 0. The metric credit information is set as follows: Count of Sources: 1; Flags: S-Flag=1, F-Flag=0, P-Flag=0; Network Address of Source: loopback-PE1 (assumed to be the IPv4 address); Total Metric Credit for Source: 10; Estimated BGP Hops Count for Source: 2 (two BGP Speakers are to pass through to the Ingress PE1).

In addition, when the BGP-intent route<prefix=loopback-PE2, color=2000> is advertised, information included in the route advertisement is set according to the intent configuration information corresponding to color-2000, that is, the metric type is set as the Unidirectional Link Delay; and an initial metric is set as 0. The metric credit information is set as follows: Count of Sources: 1; Flags: S-Flag=1, F-Flag=0, P-Flag=0; Network Address of Source: loopback-PE1 (assumed to be the IPv4 address); Total Metric Credit for Source: 100; Estimated BGP Hops Count for Source: 2 (two BGP Speakers are to pass through to the Ingress PE1).

Step 2) The ABR receives the BGP-intent route, and establishes an underlying transmission path that reaches the BGP Next-hop and satisfies the intent: when the ABR receives the BGP-intent route<prefix=loopback-PE2, color=1000>, a corresponding routing table entry is generated locally, wherein the metric type is the Unidirectional Link Delay, and the BGP Next-hop is the Egress PE2.

It should be noted that according to the metric credit information included in the route advertisement received, the ABR gets that the "the reference value of the metric credit piece" from the current BGP Speaker (that is, the ABR) to the downstream BGP Speaker neighbor (that is, the Egress PE2) is 5 ms (the total metric credit divided by 2). Then, an ABR node internally calls a constraint shortest path first (CSPF) computation module to compute an extremely low delay path (with a delay not longer than 5 ms) to the Egress PE2, which is assumed to be a TE path-12 in FIG. 5, with a delay of 4 ms. Thus, the BGP-intent route table entry<prefix=loopback-PE2, color=1000>generated on the ABR are iterated to the underlying transmission path TE path-12 of the BGP Next-hop, and the metric in the routing table entry is set as 4 accordingly. The ABR continues to advertise the BGP-intent route to the upstream BGP Speaker neighbor (the Ingress PE1), wherein the metric type is a Unidirectional Link Delay, the metric is 4, the BGP Next-hop is changed to ABR, and the metric credit information remains unchanged from the metric credit information in the route advertisement previously received.

Similarly, when the ABR receives the BGP-intent route<prefix=loopback-PE2, color=2000>, a corresponding routing table entry is generated locally, wherein the metric type is the Unidirectional Link Delay, and the BGP Next-hop is the Egress PE2. According to the metric credit information included in the route advertisement received, the ABR gets that the "the reference value of the metric credit piece" from the current BGP Speaker (that is, the ABR) to the downstream BGP Speaker neighbor (that is, the Egress PE2) is 50 ms (the total metric credit divided by 2). Then, an ABR node internally calls a CSPF computation module to compute a low delay path (with a delay not longer than 50 ms) to the Egress PE2, which is assumed to be a TE path-22 in FIG. 5, with a delay of 40 ms. Thus, the BGP-intent route table entry<prefix=loopback-PE2, color=2000>generated on the ABR are iterated to the underlying transmission path TE path-22 of the BGP Next-hop, and the metric in the routing table entry is set as 40 accordingly. The ABR continues to advertise the BGP-intent route to the upstream BGP Speaker neighbor (the Ingress PE1), wherein the metric type is a Unidirectional Link Delay, the metric is 40, the BGP Next-hop is changed to ABR, and the metric credit information remains unchanged from the metric credit information in the route advertisement previously received.

Step 3) The Ingress PE1 receives the BGP-intent route, and establishes an underlying transmission path that reaches the BGP Next-hop and satisfies the intent: when the Ingress PE1 receives the BGP-intent route<prefix=loopback-PE2, color=1000>, a corresponding routing table entry is generated locally, wherein the metric type is the Unidirectional Link Delay, and the BGP Next-hop is the ABR.

It should be noted that according to the metric credit information included in the route advertisement received, the Ingress PE1 gets that the "the reference value of the metric credit piece" from the current BGP Speaker (that is, the Ingress PE1) to the downstream BGP Speaker neighbor (that is, the ABR) is 5 ms (the total metric credit divided by 2 is 5, a metric residual credit is 6, whichever is less). Then, an Ingress PE1 node internally calls a CSPF computation module to compute an extremely low delay path (with a delay not longer than 5 ms) to the ABR, which is assumed to be a TE path-11 (path-11) in FIG. 5, with a delay of 4 ms. Thus, the BGP-intent route table entry<prefix=loopback-PE2, color=1000>generated on the Ingress PE1 are iterated to the underlying transmission path TE path-11 of the BGP Next-hop, and the metric in the routing table entry is set as 8(=4+4).

Similarly, when the Ingress PE1 receives the BGP-intent route<prefix=loopback-PE2, color=2000>, a corresponding routing table entry is generated locally, wherein the metric type is the Unidirectional Link Delay, and the BGP Next-hop is the ABR. According to the metric credit information included in the route advertisement received, the Ingress PE1 gets that the "the reference value of the metric credit piece" from the current BGP Speaker (that is, the Ingress PE1) to the downstream BGP Speaker neighbor (that is, the ABR) is 50 ms (the total metric credit divided by 2 is 50 and the metric residual credit is 60, whichever is less). Then, an Ingress PE1 node internally calls a CSPF computation module to compute a low delay path (with a delay not longer than 50 ms) to the ABR, which is assumed to be a TE path-21 (path-21) in FIG. 5, with a delay of 40 ms. Thus, the BGP-intent route table entry<prefix=loopback-PE2, color-2000>generated on the Ingress PE1 are iterated to the underlying transmission path TE path-21 of the BGP Next-hop, and the metric in the routing table entry is set as 80(=40+40).

It can be seen that in this embodiment, through the metric credit information included in the route advertisement, each BGP Speaker can establish differentiated transmission paths on a basis, so as to avoid competing for high-quality extremely low delay link resources.

Embodiment 4

Reference can be made to the network shown in FIG. Since two IGP domains are managed by a single service provider familiar with a performance index of the network, and a propagation path of BGP-intent route advertisement is clear, local policies may be configured on an Egress PE2 in this case, such that the BGP-intent route advertised includes explicit metric credit piece information. The main steps are as follows:

Step 1) The Egress PE2 generates the BGP-intent route and advertises same to the ABR: on the Egress PE2, two pieces of BGP-intent route are generated correspondingly, <prefix=loopback-PE2, color=1000> and <prefix= loopback-PE2, color=2000>, and are advertised to the ABR, and the BGP Next-hop in the route advertisement is the Egress PE2.

It should be noted that when the BGP-intent route<prefix=loopback-PE2, color=1000> is advertised, information included in the route advertisement may be set according to the intent configuration information corresponding to color-1000, that is, the metric type is set as the Unidirectional Link Delay: and an initial metric is set as 0).

The metric credit information is set as follows: Count of Sources: 1; Flags: S-Flag=1, F-Flag=0, P-Flag=1; Network Address of Source: loopback-PE1 (assumed to be the IPV4 address); Total Metric Credit for Source: 10; Estimated BGP Hops Count for Source: 2 (two BGP Speakers are to pass through to the Ingress PE1); Current Hop Number: 0; Metric Credit Piece [2]:[0]=4, [1]=6.

It should be noted that when the BGP-intent route<prefix=loopback-PE2, color=2000> is advertised, information included in the route advertisement may be set according to the intent configuration information corresponding to color-2000, that is, the metric type is set as the Unidirectional Link Delay: and an initial metric is set as 0.

The metric credit information is set as follows: Count of Sources: 1; Flags: S-Flag=1, F-Flag=0, P-Flag=0; Network Address of Source: loopback-PE1 (assumed to be the IPv4 address); Total Metric Credit for Source: 100; Estimated BGP Hops Count for Source: 2 (two BGP Speakers are to pass through to the Ingress PE1); Current Hop Number: 0); Metric Credit Piece [2]:[0]=40, [1]=60.

Step 2) The ABR receives the BGP-intent route, and establishes an underlying transmission path that reaches the BGP Next-hop and satisfies the intent: when the ABR receives the BGP-intent route<prefix=loopback-PE2, color=1000>, a corresponding routing table entry is generated locally, wherein the metric type is the Unidirectional Link Delay, and the BGP Next-hop is the Egress PE2.

It should be noted that according to the metric credit information included in the route advertisement received, the ABR gets that the "the reference value of the metric credit piece" from the current BGP Speaker (that is, the ABR) to the downstream BGP Speaker neighbor (that is, the Egress PE2) is 4 ms (the total metric credit divided by 2 is 5, and the element in the metric credit piece [0] is 4, whichever is less). Then, an ABR node internally calls a CSPF computation module to compute an extremely low delay path (with a delay not longer than 4 ms) to the Egress PE2, which is assumed to be a TE path-12 in FIG. 5, with a delay of 4 ms. Thus, the BGP-intent route table entry<prefix=loopback-PE2, color=1000>generated on the ABR are iterated to the underlying transmission path TE path-12 of the BGP Next-hop, and the metric in the routing table entry is set as 4 accordingly. The ABR continues to advertise the BGP-intent route to the upstream BGP Speaker neighbor (the Ingress PE1), wherein the metric type is a Unidirectional Link Delay, the metric is 4, the BGP Next-hop is changed to ABR, and the metric credit information (Current Hop Number automatically increases to 1).

Similarly, when the ABR receives the BGP-intent route<prefix=loopback-PE2, color=2000>, a corresponding routing table entry is generated locally, wherein the metric type is the Unidirectional Link Delay, and the BGP Next-hop is the Egress PE2. According to the metric credit information included in the route advertisement received, the ABR gets that the "the reference value of the metric credit piece" from the current BGP Speaker (that is, the ABR) to the downstream BGP Speaker neighbor (that is, the Egress PE2) is 40 ms (the total metric credit divided by 2 is 50 and an element of the metric credit piece [0] is 40, whichever is less). Then, an ABR node internally calls a CSPF computation module to compute a low delay path (with a delay not longer than 40 ms) to the Egress PE2, which is assumed to be a TE path-22 in FIG. 5, with a delay of 40 ms. Thus, the BGP-intent route table entry<prefix=loopback-PE2, color=2000>generated on the ABR are iterated to the underlying transmission path TE path-22 of the BGP Next-hop, and the metric in the routing table entry is set as 40 accordingly. The ABR continues to advertise the BGP-intent route to the upstream BGP Speaker neighbor (the Ingress PE1), wherein the metric type is a Unidirectional Link Delay, the metric is 40, the BGP Next-hop is changed to ABR, and the metric credit information (Current Hop Number automatically increases to 1).

Step 3) The Ingress PE1 receives the BGP-intent route, and establishes an underlying transmission path that reaches the BGP Next-hop and satisfies the intent: when the Ingress PE1 receives the BGP-intent route<prefix=loopback-PE2, color=1000>, a corresponding routing table entry is generated locally, wherein the metric type is the Unidirectional Link Delay, and the BGP Next-hop is the ABR.

It should be noted that according to the metric credit information included in the route advertisement received, the Ingress PE1 gets that the "the reference value of the metric credit piece" from the current BGP Speaker (that is, the Ingress PE1) to the downstream BGP Speaker neighbor (that is, the ABR) is 5 ms (the total metric credit divided by 2 is 5, a metric residual credit is 6 and an element of the metric credit piece [1] is 6, whichever is less). Then, an Ingress PE1 node internally calls a CSPF computation module to compute an extremely low delay path (with a delay not longer than 5 ms) to the ABR, which is assumed to be a TE path-11 in FIG. 5, with a delay of 4 ms. Thus, the BGP-intent route table entry<prefix=loopback-PE2, color=1000>generated on the Ingress PE1 are iterated to the underlying transmission path TE path-11 of the BGP Next-hop, and the metric in the routing table entry is set as 8(=4+4).

Similarly, when the Ingress PE1 receives the BGP-intent route<prefix=loopback-PE2, color=2000>, a corresponding routing table entry is generated locally, wherein the metric type is the Unidirectional Link Delay, and the BGP Next-hop is the ABR. According to the metric credit information included in the route advertisement received, the Ingress PE1 gets that the "the reference value of the metric credit piece" from the current BGP Speaker (that is, the Ingress PE1) to the downstream BGP Speaker neighbor (that is, the ABR) is 50 ms (the total metric credit divided by 2 is 50, the metric residual credit is 60 and an element of the metric credit piece [1] is 60, whichever is less). Then, an Ingress PE1 node internally calls a CSPF computation module to compute a low delay path (with a delay not longer than 50 ms) to the ABR, which is assumed to be a TE path-21 in FIG. 5, with a delay of 40 ms. Thus, the BGP-intent route table entry<prefix=loopback-PE2, color=2000>generated on the Ingress PE1 are iterated to the underlying transmission path TE path-21 of the BGP Next-hop, and the metric in the routing table entry is set as 80(=40+40).

Embodiment 5

Figures 6, 7, 8:
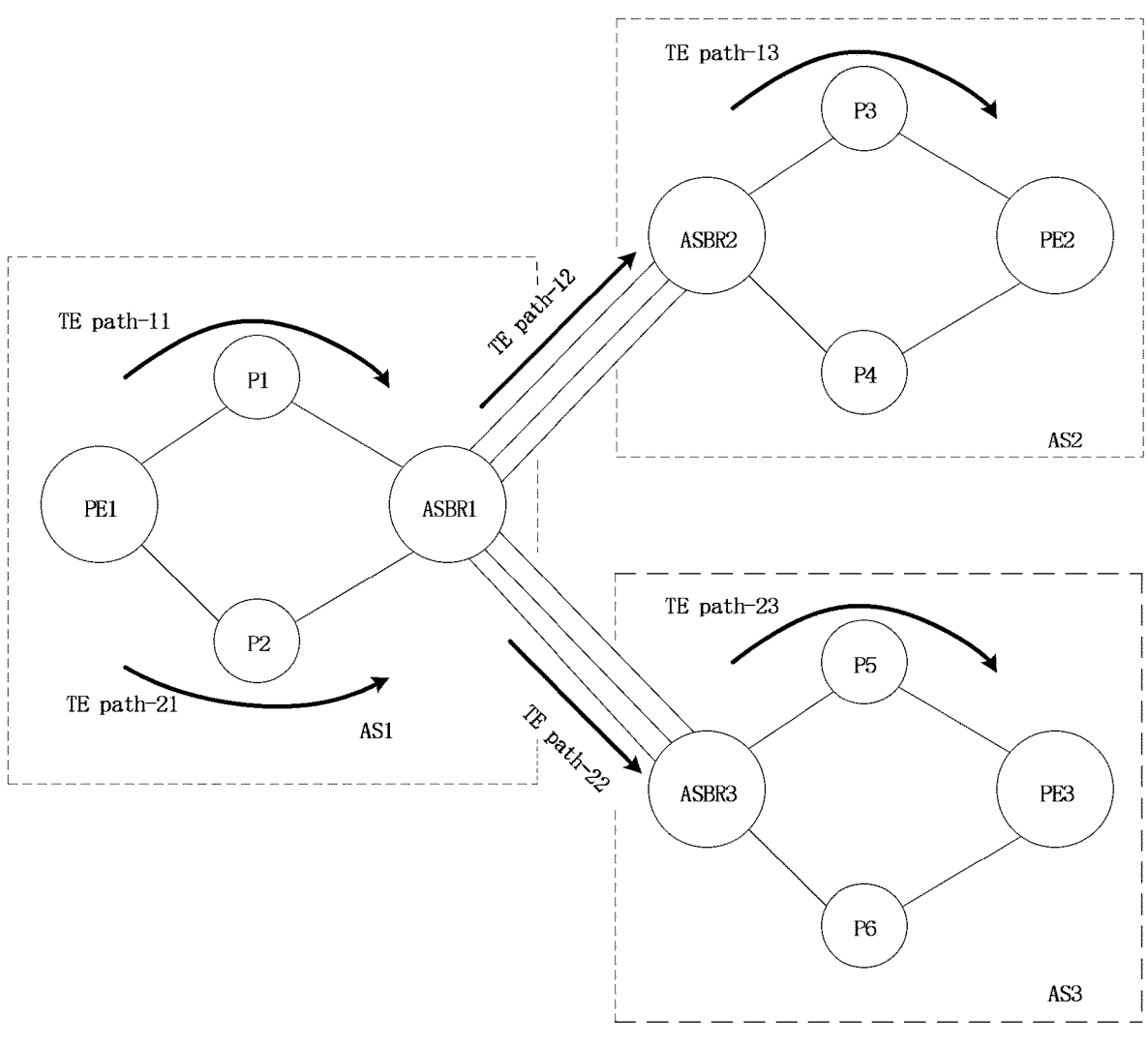
FIG. 6 is a schematic diagram of transmission paths with the same intent between a plurality of pairs of sources and destinations according to an embodiment of the disclosure.
FIG. 7 is a structural block diagram of an apparatus for receiving BGP-intent route according to an embodiment of the disclosure.
FIG. 8 is a structural block diagram of an apparatus for advertising BGP-intent route according to an embodiment of the disclosure.

A technical solution in this embodiment will be described with reference to FIG. 6. FIG. 6 is a schematic diagram of a transmission path the same intent between a plurality of pairs of sources and destinations according to an embodiment of the disclosure. A network shown in FIG. 6 includes three autonomous systems (AS). BGP neighbors are established between a PE1 and an autonomous system border router (ASBR)1, the ASBR1 and an ASBR2, the ASBR1 and an ASBR3, the ASBR2 and a PE2, and the ASBR3 and a PE3, to advertise BGP-intent route. For example, according to a method described in draft-zhou-idr-inter-domain-lcu-02, an Egress PE2 advertises loopback route (denoted as loopback-PE2) to the ASBR2 through the BGP, Egress PE3 advertises loopback route (denoted as loopback-PE3) to the ASBR3 through the BGP, and a Color extended community is carried in the route advertisement to carry intent information. The ASBR2/ASBR3 continues to perform advertisement to the ASBR1 through the BGP after receiving the route advertisement, and the ASBR1 continues to perform advertisement to an Ingress PE1 through the BGP after receiving the route advertisement, that is, the Ingress PE1, the ASBR1, the ASBR2, the ASBR3, the Egress PE2 and an Egress PE3 are BGP Speakers in the solution described above.

It is assumed that in this embodiment, the same type of service is to be communicated between the Ingress PE1 and the Egress PE2, and between the Ingress PE1 and the Egress PE3, and the intent of this type of service is specific values related to a total end-to-end delay and distance of the transmission path used.

It should be noted that by assuming that corresponding color-1000 is configured on the Egress PE2, corresponding intent is as follows: metric-type: Unidirectional Link Delay (unit: ms); total-metric: 200 (with consideration of a short actual distance); metric-credit enabled.

It should be noted that by assuming that corresponding color-1000 is configured on the Egress PE3, corresponding intent is as follows: metric-type: Unidirectional Link Delay (unit: ms); total-metric: 300 (with consideration of a short actual distance); metric-credit enabled.

The intent configuration information corresponding to the color is also uniformly configured on other BGP Speaker nodes (ASBR1, ASBR2, ASBR3 and Ingress PE1) and may not include total metric information.

A specific process is similar to that in the previous embodiment, and just key contents are described herein:

Step 1) The Egress PE2 generates BGP-intent route and advertises same to the ASBR2: on the Egress PE2, corresponding BGP-intent route<prefix=loopback-PE2, color=1000>generated is advertised to the ASBR2, and includes the following main information: a BGP Next-hop is set as loopback-PE2; and the metric type is arranged as Unidirectional Link Delay, and an initial metric is set as 0.

The metric credit information is set as follows: Count of Sources: 1; Flags: S-Flag=1, F-Flag=0, P-Flag=0; Network Address of Source: loopback-PE1 (assumed to be the IPv4 address); Total Metric Credit for Source: 200; Estimated BGP Hops Count for Source: 3 (three BGP Speakers are to pass through to the Ingress PE1).

Step 2) The Egress PE3 generates BGP-intent route and advertises same to the ASBR3: on the Egress PE3, corresponding BGP-intent route<prefix=loopback-PE3, color=1000>generated is advertised to the ASBR3, and includes the following main information: a BGP Next-hop is set as loopback-PE3 a metric type is set as a Unidirectional Link Delay, and the initial metric is set as 0.

The metric credit information is set as follows: Count of Sources: 1; Flags: S-Flag=1, F-Flag=0, P-Flag=0; Network Address of Source: loopback-PE1 (assumed to be the IPv4 address); Total Metric Credit for Source: 300; Estimated BGP Hops Count for Source: 3 (three BGP Speakers are to pass through to the Ingress PE1).

Step 3) ASBR2 receives the BGP-intent route and establishes an underlying transmission path that reaches the BGP Next-hop and satisfies the intent: when the ASBR2 receives the BGP-intent route<prefix=loopback-PE2, color=1000>, a corresponding routing table entry is generated locally, and main attributes include: a metric type is a Unidirectional Link Delay; the BGP Next-hop is loopback-PE2 (according to the reference value 66 of the metric credit piece, iteration is performed to the transmission path TEPATH-13 of PE2); the metric is 60 (adding an accumulated delay of the TE path-13 of 60 ms); and metric credit information remains unchanged from the information in the route advertisement received.

In addition, the ASBR2 continues to advertise the BGP-intent route to the ASBR1, wherein the metric type is a Unidirectional Link Delay, the metric is 60, the BGP Next-hop is changed to the ASBR2, and the metric credit information remains unchanged from the metric credit information in the route advertisement previously received.

Step 4) The ASBR3 receives the BGP-intent route, and establishes an underlying transmission path that reaches the BGP Next-hop and satisfies the intent: when the ASBR3 receives the BGP-intent route<prefix=loopback-PE3, color=1000>, a corresponding routing table entry is generated locally, and main attributes include: a metric type is a Unidirectional Link Delay; the BGP Next-hop is loopback-PE3 (according to the reference value 100 of the metric credit piece, iteration is performed to the transmission path TEPATH-23 of PE2); the metric is 100 (adding an accumulated delay of the TE path-23 of 100 ms); and metric credit information remains unchanged from the information in the route advertisement received.

In addition, the ASBR3 continues to advertise the BGP-intent route to the ASBR1, wherein the metric type is a Unidirectional Link Delay, the metric is 100, the BGP Next-hop is changed to the ASBR3, and the metric credit information remains unchanged from the metric credit information in the route advertisement previously received.

Step 5) The ASBR1 receives the BGP-intent route, and establishes an underlying transmission path that reaches the BGP Next-hop and satisfies the intent: when the ASBR1 receives the BGP-intent route<prefix=loopback-PE2, color=1000>, a corresponding routing table entry is generated locally, and main attributes include: a metric type is a Unidirectional Link Delay; the BGP Next-hop is the ASBR2 (according to the reference value 66 of the metric credit piece, iteration is performed to the transmission path TE path-12 of the ASBR2); the metric is 70 (adding an accumulated delay of the TE path-12 of 10 ms); and metric credit information remains unchanged from the information in the route advertisement received.

In addition, the ASBR1 continues to advertise the BGP-intent route to the Ingress PE1, wherein the metric type is a Unidirectional Link Delay, the metric is 70, the BGP Next-hop is changed to the ASBR1, and the metric credit information remains unchanged from the metric credit information in the route advertisement previously received.

Similarly, when the ASBR1 receives the BGP-intent route<prefix=loopback-PE3, color=1000>, a corresponding routing table entry is generated locally, and main attributes include: a metric type is a Unidirectional Link Delay; the BGP Next-hop is the ASBR3 (according to the reference value 100 of the metric credit piece, iteration is performed to the transmission path TE path-22 of the ASBR3); the metric is 110 (adding an accumulated delay of the TE path-22 of 10 ms); and metric credit information remains unchanged from the information in the route advertisement received.

In addition, the ASBR1 continues to advertise the BGP-intent route to the Ingress PE1, wherein the metric type is a Unidirectional Link Delay, the metric is 110, the BGP Next-hop is changed to the ASBR1, and the metric credit information remains unchanged from the metric credit information in the route advertisement previously received.

Step 6) The Ingress PE1 receives the BGP-intent route, and establishes an underlying transmission path that reaches the BGP Next-hop and satisfies the intent: when the Ingress PE1 receives the BGP-intent route<prefix=loopback-PE2, color=1000>, a corresponding routing table entry is generated locally, and main attributes include: a metric type is a Unidirectional Link Delay; the BGP Next-hop is the ASBR1 (according to the reference value 66 of the metric credit piece, iteration is performed to the transmission path TE path-11 of the ASBR2); the metric is 130 (adding an accumulated delay of the TE path-11 of 60 ms); and metric credit information remains unchanged from the information in the route advertisement received.

Similarly, when the Ingress PE1 receives the BGP-intent route<prefix-loopback-PE3, color=1000>, a corresponding routing table entry is generated locally, and main attributes include: a metric type is a Unidirectional Link Delay: the BGP Next-hop is the ASBR1 (according to the reference value 100 of the metric credit piece, iteration is performed to the transmission path TE path-21 of the ASBR1); the metric is 210 (adding an accumulated delay of the TE path-22 of 100 ms); and metric credit information remains unchanged from the information in the route advertisement received.

According to the technical solution in this embodiment, the transmission path can be established on a basis, and differentiated resource forwarding is provided, so as to avoid competing of all services for high-quality resources.

In addition, the technical solution in the embodiment may be applied to IPRAN/SPN, a metropolitan area network (MAN)/backbone, but is not limited to thereto.

FIG. 7 is a structural block diagram of an apparatus for receiving BGP-intent route according to an embodiment of the disclosure. As shown in FIG. 7, the apparatus for receiving BGP-intent route includes:

a Receiving module 702 configured to receive the BGP-intent route advertised by a BGP speaker, wherein the BGP-intent route carries at least one of the following: a metric type, a metric and metric credit information.

According to the solution, the BGP-intent route advertised by the BGP speaker is received, wherein the BGP-intent route carries at least one of the following: the metric type, the metric and the metric credit information. Thus, the problem that contents carried in the BGP-intent route decrease efficiency of establishment of the transmission path of the BGP-intent route in the related art is solved, and the efficiency of establishment of the transmission path is further improved by carrying the metric type, the metric and the metric credit information in the BGP-intent route.

Further, the metric type includes an interior gateway protocol (IGP) metric, a link delay metric, a link and node delay metric, a traffic engineering (TE) default metric and a bandwidth metric; the metric credit information includes: a total metric credit, an estimated BGP hops count and a metric credit piece; and the metric credit information only includes one piece of information unrelated to a specific source; and alternatively, the metric credit information includes a plurality of pieces of information, and the plurality of pieces of information correspond to a plurality of specific sources in a one-to-one manner.

It should be noted that the link delay metric may include a link delay, but is not limited thereto.

It should be noted that the link and node delay metric may simultaneously include a link delay and a delay in a node, but is not limited thereto.

Further, the apparatus for receiving BGP-intent route further includes: an obtainment module configured to obtain an intent identifier from the BGP-intent route, and obtain intent information by locally searching, according to the intent identifier, for an intent template: and establish a transmission path or select an existing transmission path for the BGP-intent route according to the intent information.

Further, the obtainment module is further configured to determine a reference value of a metric credit piece of a transmission path between a current BGP speaker and a downstream neighbor BGP speaker of the current BGP speaker according to the metric, a total metric credit, an estimated BGP hops count and a metric credit piece that are included in the BGP-intent route: and limit an accumulated metric of a metric type of the transmission path established or the existing transmission path selected to be less than or equal to the reference value of the metric credit piece, and establish the transmission path or selecting the existing transmission path.

Further, the apparatus for receiving BGP-intent route further includes: a first metric obtainment module configured to under the condition that the metric credit information included in the BGP-intent route only includes a total metric credit related to a source, but does not include an explicit metric credit piece, for a metric credit attribute corresponding to each source: obtain an average metric credit between two adjacent BGP speakers in an end-to-end path by dividing the total metric credit by an estimated BGP hops count: and obtain a metric residual value by subtracting the metric included in the BGP-intent route from the total metric credit.

Further, the first metric obtainment module is further configured to compute an average metric credit and metric residual values for all sources: wherein a reference value of a metric credit piece of a transmission path between a current BGP speaker and a downstream neighbor BGP speaker includes a minimum positive value of the average metric credit and the metric residual values that are computed for all sources.

Further, the apparatus for receiving BGP-intent route further includes a second metric obtainment module configured to under the condition that the BGP-intent route further includes an explicit metric credit piece, for metric credit information corresponding to each source: obtain a metric credit piece corresponding to a current BGP speaker from the BGP-intent route according to a position number of the current BGP speaker in an end-to-end path: and obtain a metric residual value by subtracting the metric included in the BGP-intent route from a total metric credit.

Further, the second metric obtainment module is further configured to compute metric credit pieces and metric residual values for all sources, wherein a reference value of a metric credit piece of a transmission path between a current BGP speaker and a downstream neighbor BGP speaker includes a minimum positive value of the metric credit pieces and the metric residual values that are computed for all the sources.

Further, the obtainment module is further configured to select a path whose accumulated metric of a metric type is closest to the reference value of the metric credit piece from all candidate transmission paths under the condition a current BGP speaker finds that there is no transmission path that extends to a downstream BGP speaker and satisfies the reference value of the metric credit piece.

Further, in an embodiment, a transmission path from the current BGP speaker to the downstream BGP speaker at least includes one of the following: a shortest forwarding path and a traffic engineering path. The transmission path includes a plurality of sub-paths, and through the plurality of sub-paths, a load sharing, or fast reroute (FRR) protection, or a multi-stream replication and elimination path is formed, wherein under the condition the multi-stream replication and elimination path is formed through the plurality of sub-paths, a metric difference between the plurality of sub-paths satisfies a set limit value.

FIG. 8 is a structural block diagram of an apparatus for advertising BGP-intent route according to an embodiment of the disclosure. As shown in FIG. 8, the apparatus for advertising BGP-intent route includes:

an advertisement module 802 configured to advertise the BGP-intent route to a neighbor BGP speaker, wherein the BGP-intent route carries at least one of the following: a metric type, a metric and metric credit information.

According to the solution, the BGP-intent route is advertised to the neighbor BGP speaker, wherein the BGP-intent route carries at least one of the following: the metric type, the metric and the metric credit information. Thus, the problem that contents carried in the BGP-intent route decrease efficiency of establishment of the transmission path of the BGP-intent route in the related art is solved, and the efficiency of establishment of the transmission path is further improved by carrying the metric type, the metric and the metric credit information in the BGP-intent route.

Further, in an embodiment, the metric type includes an IGP metric, a link delay metric, a link and node delay metric, a TE default metric and a bandwidth metric; the metric credit information includes: a total metric credit, an estimated BGP hops count and a metric credit piece; and the metric credit information only includes one piece of information unrelated to a specific source; and alternatively, the metric credit information includes a plurality of pieces of information, and the plurality of pieces of information correspond to a plurality of specific sources in a one-to-one manner.

Further, it should be noted that a metric corresponding to the metric type equals a sum of a metric included in a BGP-intent route advertisement received from a downstream neighbor BGP speaker and an accumulated metric corresponding to a metric type of a transmission path from a current BGP speaker to the downstream neighbor BGP speaker; and alternatively, a metric corresponding to the metric type equals a certain initial value set under the condition a current BGP speaker is an original advertisement node.

It should be noted that the initial value may equal 0, but is not limited thereto.

In an illustrative example, the computer-readable storage medium described above may include, but is not limited to, a USB flash drive, a read-only memory (ROM), a random access memory (RAM), a mobile hard disk drive, a diskette or optical disk, etc., that may store the computer program.

Reference can be made to instances described in the embodiments and illustrative embodiments described above for specific instances in this embodiment, which will not be repeated in this embodiment.

An embodiment of the disclosure further provides an electronic apparatus. The electronic apparatus includes a memory and a processor, wherein the memory stores a computer program, and the processor is configured to execute steps in any method embodiment described above by running the computer program.

Optionally, in this embodiment, the processor may be configured to execute the following steps through the computer program:

S1, The BGP-intent route advertised by a BGP speaker is received, wherein the BGP-intent route carries at least one of the following: a metric type, a metric and metric credit information.

Optionally, in other embodiments, the processor may further be configured to execute the following steps through the computer program:

S1, The BGP-intent route is advertised to a neighbor BGP speaker, wherein the BGP-intent route carries at least one of the following: a metric type, a metric and metric credit information.

In an illustrative embodiment, the electronic apparatus may further include a transmission device and an input and output device, wherein the transmission device is connected to the processor described above and the input and output device is connected to the processor described above.

Reference can be made to instances described in the embodiments and illustrative embodiments above for specific instances in this embodiment, which will not be repeated in this embodiment.

Apparently, a person skilled in the art should understand that the modules or steps above of the disclosure can be implemented by a general-purpose computation apparatus, can be centralized on a single computation apparatus or distributed over a network formed by a plurality of computation apparatuses, and can be implemented through program codes executable by the computation apparatus. Thus, the modules or steps can be stored in a storage apparatus and executed by the computation apparatus, and in some cases, the steps shown or described can be executed in a sequence different from a sequence described herein, or the steps can be separately made into integrated circuit modules, or a plurality of modules or steps among the steps can be made into a single integrated circuit module to be implemented. In this way, the disclosure is not limited to any specific hardware and software combination.

The above embodiments are only preferred examples of the disclosure and are not intended to limit the disclosure, and for a person of ordinary skill in the art, various modifications and changes can be made to the disclosure. Any modification, equivalent substitution and improvement, etc. made within the principles of the disclosure should fall within the protection scope of the disclosure.

What is claimed is:

1. A method for receiving border gateway protocol (BGP)-intent route, comprising:

receiving a BGP-intent route advertised by a BGP speaker, wherein the BGP-intent route carries at least one of the following: a metric type, a metric, and metric credit information;

wherein after the receiving BGP-intent route advertised by the BGP speaker, the method further comprises:

obtaining an intent identifier from the BGP-intent route, and locally searching for an intent template based on the intent identifier to obtain intent information;

determining a reference value of a metric credit piece of a transmission path between a current BGP speaker and a downstream neighbor BGP speaker of the current BGP speaker according to the metric, a total metric credit, an estimated BGP hops count and a metric credit piece that are comprised in the BGP-intent route; and limiting an accumulated metric of a metric type of the transmission path or an existing transmission path to be selected to be less than or equal to the reference value of the metric credit piece, and establishing the transmission path or selecting the existing transmission path.

2. The method for receiving BGP-intent route according to claim 1, wherein the metric type comprises an interior gateway protocol (IGP) metric, a link delay metric, a link and node delay metric, a traffic engineering (TE) default metric, and a bandwidth metric;

the metric credit information comprises: a total metric credit, an estimated BGP hops count, and a metric credit piece; and the metric credit information only comprises one piece of information, which is unrelated to a specific source; or the metric credit information comprises a plurality of pieces of information, and the plurality of pieces of information correspond to a plurality of specific sources in a one-to-one manner.

3. An electronic apparatus, comprising a memory and a processor, wherein the memory stores a computer program, and the processor is configured to execute the computer program to perform the method as claimed in claim 2.

4. The method for receiving BGP-intent route according to claim 1, further comprising:

in a case that the metric credit information comprised in the BGP-intent route only comprises a total metric credit related to a source, but does not comprise an explicit metric credit piece, for a metric credit attribute corresponding to each source:

obtaining an average metric credit between two adjacent BGP speakers in an end-to-end path by dividing the total metric credit by an estimated BGP hops count; and obtaining a metric residual value by subtracting the metric comprised in the BGP-intent route from the total metric credit.

5. The method for receiving BGP-intent route according to claim 4, further comprising:

computing an average metric credit and metric residual values for all sources: wherein a reference value of a metric credit piece of a transmission path between a current BGP speaker and a downstream neighbor BGP speaker comprises a minimum positive value of the average metric credit and the metric residual values that are computed for all sources.

6. The method for receiving BGP-intent route according to claim 4, wherein a particular transmission path from the current BGP speaker to the downstream neighbor BGP speaker at least comprises one of the following: a shortest forwarding path and a traffic engineering path; and the particular transmission path comprises a plurality of sub-paths, and through the plurality of sub-paths, a load sharing, or fast reroute (FRR) protection, or a multi-stream replication and elimination path is formed, wherein under a condition the multi-stream replication and elimination path is formed through the plurality of sub-paths, a metric difference between the plurality of sub-paths satisfies a set limit value.

7. The method for receiving BGP-intent route according to claim 1, further comprising:

in a case that the BGP-intent route further comprises an explicit metric credit piece, for metric credit information corresponding to each source:

obtaining a metric credit piece corresponding to a current BGP speaker from the BGP-intent route according to a position number of the current BGP speaker in an end-to-end path; and obtaining a metric residual value by subtracting the metric comprised in the BGP-intent route from a total metric credit.

8. The method for receiving BGP-intent route according to claim 7, further comprising:

computing metric credit pieces and metric residual values for all sources, wherein a reference value of a metric credit piece of a transmission path between a current BGP speaker and a downstream neighbor BGP speaker comprises a minimum positive value of the metric credit pieces and the metric residual values that are computed for all the sources.

9. The method for receiving BGP-intent route according to claim 1, further comprising:

selecting a path having an accumulated metric of a particular metric type closest to the reference value of the metric credit piece from all candidate transmission paths under a condition the current BGP speaker finds that there is no transmission path that extends to the downstream neighbor BGP speaker and satisfies the reference value of the metric credit piece.

10. A non-transitory computer-readable storage medium, storing a computer program, wherein the computer program is configured to, when executed by a processor, perform the method as claimed in claim 1.

11. An electronic apparatus, comprising a memory and a processor, wherein the memory stores a computer program, and the processor is configured to execute the computer program to perform the method as claimed in claim 1.

12. A method for advertising border gateway protocol (BGP)-intent route, comprising:

advertising the BGP-intent route to a neighbor BGP speaker, wherein the BGP-intent route carries at least one of the following: a metric type, a metric and metric credit information, wherein the neighbor BGP speaker obtains an intent identifier from the BGP-intent route, locally searches for an intent template based on the intent identifier to obtain intent information, determines a reference value of a metric credit piece of a transmission path between a current BGP speaker and a downstream neighbor BGP speaker of the current BGP speaker according to the metric, a total metric credit, an estimated BGP hops count and a metric credit piece that are comprised in the BGP-intent route, limits an accumulated metric of a metric type of the transmission path established or an existing transmission path to be selected to be less than or equal to the reference value of the metric credit piece, and establishes the transmission path or selects the existing transmission path.

13. The method for advertising BGP-intent route according to claim 12, wherein the metric type comprises an interior gateway protocol (IGP) metric, a link delay metric, a link and node delay metric, a traffic engineering (TE) default metric and a bandwidth metric;

the metric credit information comprises: a total metric credit, an estimated BGP hops count and a metric credit piece; and the metric credit information only comprises one piece of information unrelated to a specific source; and alternatively, the metric credit information comprises a plurality of pieces of information, and the plurality of pieces of information correspond to a plurality of specific sources in a one-to-one manner.

14. The method for advertising BGP-intent route according to claim 12, wherein a particular metric corresponding to the metric type equals a sum of a metric comprised in a BGP-intent route advertisement received from the downstream neighbor BGP speaker and an accumulated metric corresponding to a particular metric type of a particular transmission path from the current BGP speaker to the downstream neighbor BGP speaker; and alternatively, another particular metric corresponding to the metric type equals a certain initial value set under a condition the current BGP speaker is an original advertisement node.

15. An electronic apparatus, comprising a memory and a processor, wherein the memory stores a computer program, and the processor is configured to execute the computer program to perform the method as claimed in claim 12.

16. An apparatus for receiving border gateway protocol (BGP)-intent route, the apparatus comprising a memory and a processor, wherein the memory stores a computer program, and the processor is configured to execute the computer program to perform a method comprising:

receiving the BGP-intent route advertised by a BGP speaker, wherein the BGP-intent route carries at least one of the following: a metric type, a metric and metric credit information;

wherein after the receiving BGP-intent route advertised by the BGP speaker, the method further comprises:

obtaining an intent identifier from the BGP-intent route, and locally searching for an intent template based on the intent identifier to obtain intent information;

determining a reference value of a metric credit piece of a transmission path between a current BGP speaker and a downstream neighbor BGP speaker of the current BGP speaker according to the metric, a total metric credit, an estimated BGP hops count and a metric credit piece that are comprised in the BGP-intent route; and limiting an accumulated metric of a metric type of the transmission path or an existing transmission path to be selected to be less than or equal to the reference value of the metric credit piece, and establishing the transmission path or selecting the existing transmission path.

* * * * *